Oct. 13, 1959  S. I. OLSEN  2,908,312
ANTISKID TREAD FOR AUTOMOBILE TIRES
Filed May 8, 1958
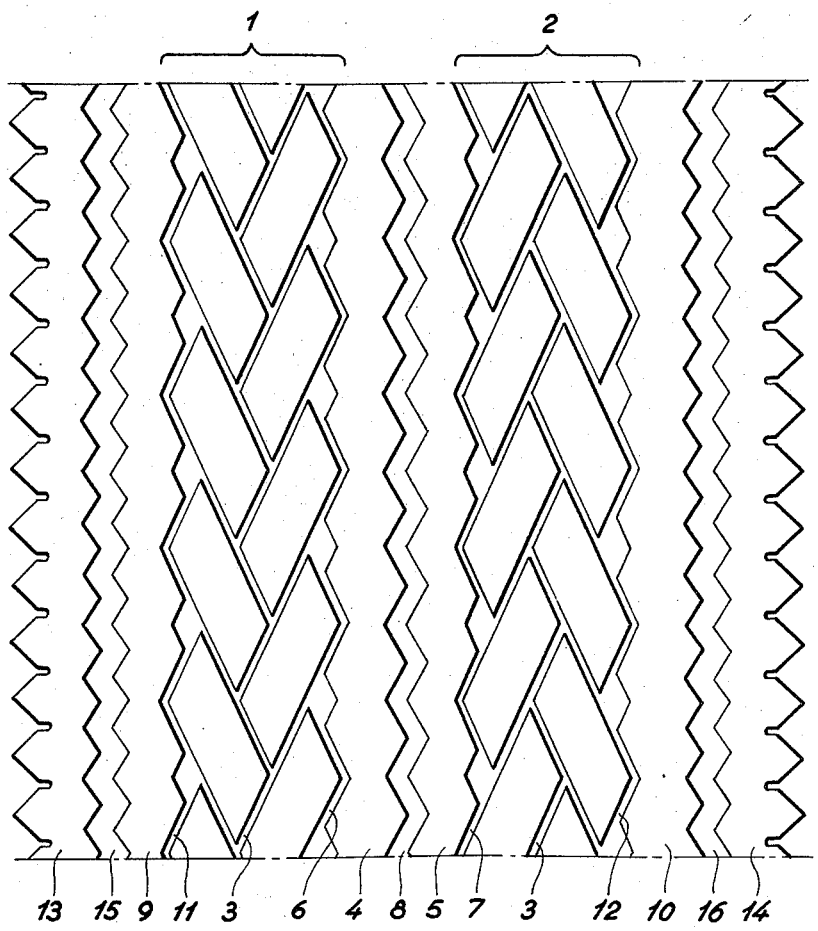
Inventor:
Sigurd I. Olsen
By Kurt Kelman
His Agent

United States Patent Office 2,908,312
Patented Oct. 13, 1959

2,908,312

ANTISKID TREAD FOR AUTOMOBILE TIRES

Sigurd Ingemann Olsen, Odense, Denmark

Application May 8, 1958, Serial No. 734,022

2 Claims. (Cl. 152—209)

The present invention relates to an improved antiskid tread for automobile tires.

Many types of treads for automobile tires have been proposed, with the special purpose to prevent skidding on slippery road surfaces. In one type of tire tread for this purpose there are employed in combination circumferential groups of rubber studs or cleats arranged in a so-called braid pattern, i.e. each stud is disposed obliquely in such a manner that it lies alongside a part of an adjacent stud and alongside the end of another adjacent stud, and a number of circumferential ribs along either side of the groups of studs and separated therefrom by means of relatively wide grooves.

Hitherto known types of treads for automobile tires of the above described pattern have, however, proved ineffective as regards the prevention of skidding. The reason of this is that during driving and upon application of the brakes and during a skid the studs are subjected to considerable bending actuations which in combination with the compression due to the weight of the vehicle result in a rounding off of the edges of the studs by wear, thus reducing their effect as regards prevention of skid and traction and at the same cause a successively increase of the speed of wear. This circumstance results furthermore in the disadvantage that the circumferential rib or ribs, which in relation to the studs are stiff and usually of considerably greater width than the studs, are subjected to less bending and wear than the studs, to the effect that after a short while the tread has one or several portions which protrude higher than the studs, thereby considerably further reducing the effect of the tread to prevent lateral skid as well as reducing its traction and breaking capacity.

In order to retain its full effect the tread must be constructed in such a manner that the rubber studs in the braid pattern are supported at all sides during driving and skidding as well as upon application of the brakes, in order to avoid the aforesaid wear causing the rounding off of the stud edges and corners.

The main object of the invention is therefore to provide a tire tread in which wear of the studs is considerably reduced. According to the invention this is attained by means of a tire tread which in combination comprises two circumferential groups of rubber studs arranged in a braid pattern within each group, said studs within each group being spaced apart by means of narrow slits, on either side of each said group of studs one circumferential rubber rib spaced from said group of studs by means of a slit of substantially the same width as the slits intervening the studs, and a circumferential rubber rib forming the tire shoulder at each side of the tread and spaced from the adjacent circumferential rubber rib by means of a groove having substantially greater width that the aforesaid slits.

By means of this combination in a tire tread the studs, when subjected to vertical or slanting pressure actuations, will only be slightly bent, because the narrow slits between the studs and between the studs and the adjacent circumferential ribs will provide for an effective support of the studs either by means of the adjacent studs or by the adjacent circumferential ribs. Owing to this support the studs will only be bent in such a manner that their edges and corners are not subjected to such wear that the edges and corners are rounded off and thus retain a firm grip on the road surface. A further result of this is that the life of the tire is prolonged, and its full effect as regards traction and braking capacity and consequently also its effect to prevent a lateral skid is retained.

Practical tests have shown that the best results are obtained when the circumferential rubber ribs have approximately the same width as the single studs, because wear of the studs and of the ribs will be distributed evenly.

Other objects of the invention will be evident from the following description taken in conjunction with the accompanying drawing, in which is shown in plan view a portion of a tread according to the invention.

Referring to the drawing, the tread consists of two groups 1 and 2 of studs, in each of which groups the studs are arranged in a braid pattern. Each of said groups consists of a number of uniform rubber studs having rhomboidal shape and a width not exceeding one third of its length. These studs are spaced apart a distance not exceeding one quarter of the width of a stud by means of a slit 3. Preferably the slit 3 has a width of 1½ to 2 millimeters, and each stud has a width of 8 to 10 millimeters and a length of about 25 to 30 millimeters.

In the one group the studs are arranged in an oblique formation oppositely directed to the oblique formation of the braid pattern of the other group.

In the tread shown the two groups 1 and 2 of studs arranged in braid pattern are separated from each other by means of two circumferential rubber ribs 4 and 5, each rib having a width approximately equal to the width of a stud. Each rib 4 and 5 is separated from the adjacent group of studs 1 and 2 respectively by means of a slit 6 and 7 respectively, each slit having a width equal to the width of the slits 3. The two circumferential ribs 4 and 5 are interspaced by means of a groove 8 which is somewhat wider, preferably at least twice the width of the aforesaid slits 3, 6 and 7.

Along each side of the tire there is provides a circumferential rib 9 and 10 respectively, each rib having the same width as the circumferential ribs 4 and 5. Each of these ribs is separated from the adjacent group of studs by means of a slit 11 and 12 respectively of the same width as the slits 3, 6 and 7. Further, each said circumferential rib 9 or 10 is separated from the tire shoulders 13 and 14 respectively by means of a circumferential groove 15 and 16 respectively of approximately the same width as groove 8 which separates the inner circumferential ribs 4 and 5 from each other.

I declare that what I claim is:

1. An antiskid tread for automobile tires, comprising in combination two circumferential groups of rubber studs, each group consisting of a plurality of said studs arranged obliquely in a braid pattern and defining narrow slits therebetween, on either side of each said group of studs a circumferential rubber rib defining with the adjacent group of studs over a major portion of the circumference a slit not exceeding the width of the slits between the studs, and a further circumferential rubber rib forming the tire shoulder at each side of the tread and defining with an adjacent one of said first-named circumferential rubber ribs a groove having substantially greater width than said slits.

2. An antiskid tread as claimed in claim 1, in which the studs are uniform in size with rhomboidal surface, and the circumferential rubber ribs have substantially the same width as any one of said studs.

References Cited in the file of this patent

UNITED STATES PATENTS

D. 182,941  Wilson ---------------- May 27, 1958

FOREIGN PATENTS 754,438  Great Britain ------------ Aug. 8, 1956